(12) United States Patent
Yamashita et al.

(10) Patent No.: US 11,493,803 B2
(45) Date of Patent: Nov. 8, 2022

(54) DISPLAY DEVICE AND LIGHT-DIFFUSING SHEET STACKED BODY

(71) Applicants: NICHIA CORPORATION, Anan (JP); KEIWA Inc., Tokyo (JP)

(72) Inventors: Ryohei Yamashita, Tokushima (JP); Yusaku Achi, Tokushima (JP); Chengheng Tsai, Chuo-ku (JP)

(73) Assignees: NICHIA CORPORATION, Anan (JP); KEIWA Inc., Tokyo (JP)

( * ) Notice: Subject to any disclaimer, the term of this patent is extended or adjusted under 35 U.S.C. 154(b) by 0 days.

(21) Appl. No.: 17/304,840

(22) Filed: Jun. 25, 2021

(65) Prior Publication Data
US 2021/0405451 A1 Dec. 30, 2021

(30) Foreign Application Priority Data
Jun. 26, 2020 (JP) .............................. JP2020-110955

(51) Int. Cl.
| G02F 1/13357 | (2006.01) |
| F21V 8/00 | (2006.01) |
| G02B 5/02 | (2006.01) |
| B32B 27/08 | (2006.01) |

(52) U.S. Cl.
CPC ........ *G02F 1/133606* (2013.01); *B32B 27/08* (2013.01); *G02B 5/0231* (2013.01); *G02B 6/0025* (2013.01); *G02F 1/133603* (2013.01)

(58) Field of Classification Search
None
See application file for complete search history.

(56) References Cited

U.S. PATENT DOCUMENTS

| 8,692,962 B2 * | 4/2014 | Shibata | ................. G02B 5/045 349/112 |
| 2001/0046134 A1 * | 11/2001 | Masaki | ............... G02B 5/0215 362/339 |

(Continued)

FOREIGN PATENT DOCUMENTS

| CN | 109557719 A | * | 4/2019 |
| JP | H08146207 A | | 6/1996 |

(Continued)

*Primary Examiner* — Britt D Hanley
(74) *Attorney, Agent, or Firm* — Hunton Andrews Kurth LLP

(57) ABSTRACT

A display device includes a light-emitting module and a light-diffusing sheet stacked body. The light-emitting module includes at least one light guide plate including an upper surface and a lower surface, and light sources disposed at the lower surface side of the light guide plate. The light-diffusing sheet stacked body includes a first light-diffusing sheet disposed on the light guide plate, a second light-diffusing sheet disposed on the first light-diffusing sheet, and a third light-diffusing sheet disposed on the second light-diffusing sheet. The first light-diffusing sheet includes first protrusions at an upper surface side thereof. The second light-diffusing sheet includes second protrusions at an upper surface side thereof. The third light-diffusing sheet includes third protrusions at an upper surface side thereof. A shape of the third protrusion may be different from a shape of the first protrusions and/or a shape of the second protrusions.

12 Claims, 9 Drawing Sheets

(56) References Cited

U.S. PATENT DOCUMENTS

| | | | | |
|---|---|---|---|---|
| 2008/0111948 | A1* | 5/2008 | Epstein | G02F 1/133604 |
| | | | | 349/64 |
| 2008/0192174 | A1 | 8/2008 | Odake et al. | |
| 2010/0309411 | A1* | 12/2010 | Shibata | G02B 3/0031 |
| | | | | 349/64 |
| 2011/0037736 | A1* | 2/2011 | Epstein | G02B 5/045 |
| | | | | 345/204 |
| 2015/0085470 | A1* | 3/2015 | Shimada | G02B 3/0056 |
| | | | | 362/97.1 |
| 2017/0115433 | A1* | 4/2017 | Kim | B32B 27/32 |
| 2019/0049649 | A1* | 2/2019 | Hayashi | G02B 6/0051 |
| 2020/0116919 | A1* | 4/2020 | Lee | G02B 5/0221 |
| 2020/0292881 | A1* | 9/2020 | Tsai | G02B 5/0221 |

FOREIGN PATENT DOCUMENTS

| | | | | |
|---|---|---|---|---|
| JP | 2001311809 | A | | 11/2001 |
| JP | 2005352426 | A | | 12/2005 |
| JP | 2010210882 | A | * | 9/2010 |
| JP | 2011018014 | A | | 1/2011 |
| JP | 2011022265 | A | | 2/2011 |
| JP | 2012042610 | A | | 3/2012 |
| WO | WO-2009110145 | A1 | * | 9/2009 ........... G02B 6/0068 |

* cited by examiner

DISPLAY DEVICE AND LIGHT-DIFFUSING SHEET STACKED BODY

CROSS-REFERENCE TO RELATED APPLICATIONS

This application is based upon and claims the benefit of priority from the prior Japanese Patent Application No. 2020-110955, filed on Jun. 26, 2020; the entire contents of which are incorporated herein by reference.

FIELD

The present disclosure relates to a display device and a light-diffusing sheet stacked body.

BACKGROUND

A planar light source in which a plurality of light-emitting diodes (LEDs) are arranged in a planar configuration is used as the backlight of a transmission-type display device such as a liquid crystal panel or the like. A light-diffusing sheet is disposed between the liquid crystal panel and the LEDs to make the luminance of such a planar light source uniform. It is desirable for the planar light source to be thin and to have uniform luminance.

SUMMARY

According to one aspect of the present disclosure, a display device includes a light-emitting module and a light-diffusing sheet stacked body. The light-emitting module includes at least one light guide plate including an upper surface and a lower surface, and a plurality of light sources disposed at a lower surface side of the light guide plate. The light-diffusing sheet stacked body includes a first light-diffusing sheet disposed on the light guide plate, a second light-diffusing sheet disposed on the first light-diffusing sheet, and a third light-diffusing sheet disposed on the second light-diffusing sheet. The first, second, and third light-diffusing sheets each includes a light-diffusing material in a resin material. The first light-diffusing sheet includes a plurality of first protrusions or first recesses at an upper surface side of the first light-diffusing sheet. The second light-diffusing sheet includes a plurality of second protrusions or second recesses at an upper surface side of the second light-diffusing sheet. The third light-diffusing sheet includes a plurality of third protrusions or third recesses at an upper surface side of the third light-diffusing sheet. A shape of the third protrusion is different from a shape of the first protrusions and/or a shape of the second protrusions. A shape of the third recess is different from a shape of the first recesses and/or a shape of the second recesses.

According to one aspect of the present disclosure, a light-diffusing sheet stacked body includes a first light-diffusing sheet, a second light-diffusing sheet, and a third light-diffusing sheet that are stacked. The first, second, and third light-diffusing sheets each includes a light-diffusing material in a resin material. The first light-diffusing sheet includes a plurality of first protrusions or first recesses at an upper surface side of the first light-diffusing sheet. The second light-diffusing sheet includes a plurality of second protrusions or second recesses at an upper surface side of the second light-diffusing sheet. The third light-diffusing sheet includes a plurality of third protrusions or third recesses at an upper surface side of the third light-diffusing sheet. A shape of the third protrusion is different from a shape of the first protrusions and/or a shape of the second protrusions. A shape of the third recess is different from a shape of the first recesses and/or a shape of the second recesses.

DETAILED DESCRIPTION

First Embodiment

First, a first embodiment will be described.

Figure 1:
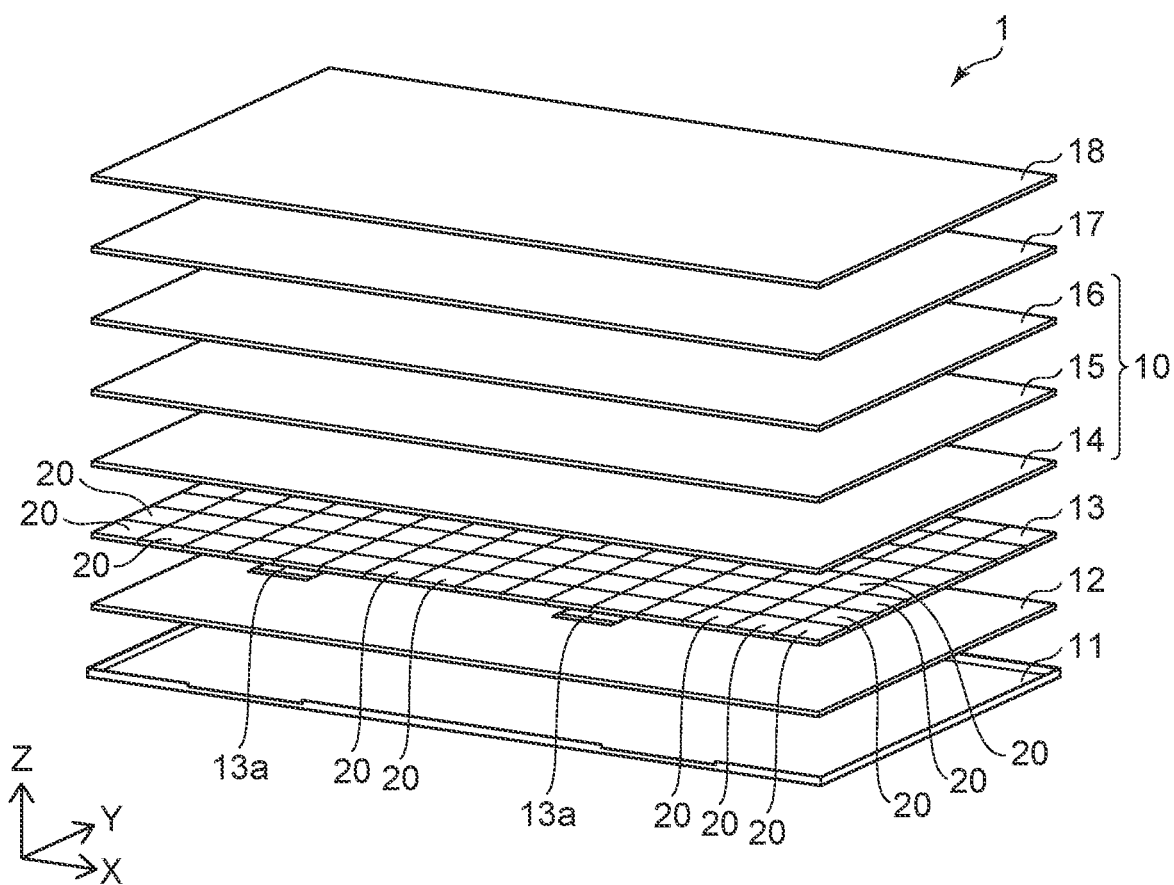
FIG. 1 is an exploded perspective view showing a display device according to a first embodiment of the present disclosure.

FIG. 1 is an exploded perspective view showing a display device according to the present embodiment.

For example, the display device according to the present embodiment can be used as the backlight of a liquid crystal panel.

As shown in FIG. 1, a back chassis 11, a double-sided tape 12, a planar light source 13, a first light-diffusing sheet 14, a second light-diffusing sheet 15, a third light-diffusing sheet 16, a first prism sheet 17, and a second prism sheet 18 are stacked in this order in the display device 1 according to the present embodiment. The members described above have substantially rectangular plate shapes. Among these members, the members that are next to each other in the stacking direction contact each other.

The back chassis 11 is, for example, a plate of a metal such as aluminum, etc. The back chassis 11 and the planar light source 13 are bonded by the double-sided tape 12. The planar light source 13 includes a plurality of light-emitting modules 20. A light-diffusing sheet stacked body 10 includes the first light-diffusing sheet 14, the second light-diffusing sheet 15, and the third light-diffusing sheet 16.

For convenience of description in the specification, the stacking direction of the members is taken as a "Z-direction"; the longitudinal direction of the members is taken as an "X-direction"; and the transverse direction of the members is taken as a "Y-direction". Among the Z-directions, the direction from the back chassis 11 toward the second prism sheet 18 also is called "up", and the reverse direction is called "down"; however, these expressions are for convenience and are independent of the direction of gravity. When the display device 1 is used as the backlight of a display panel, for example, the X-direction corresponds to the horizontal direction of the screen; and the Y-direction corresponds to the vertical direction of the screen.

Figure 2:
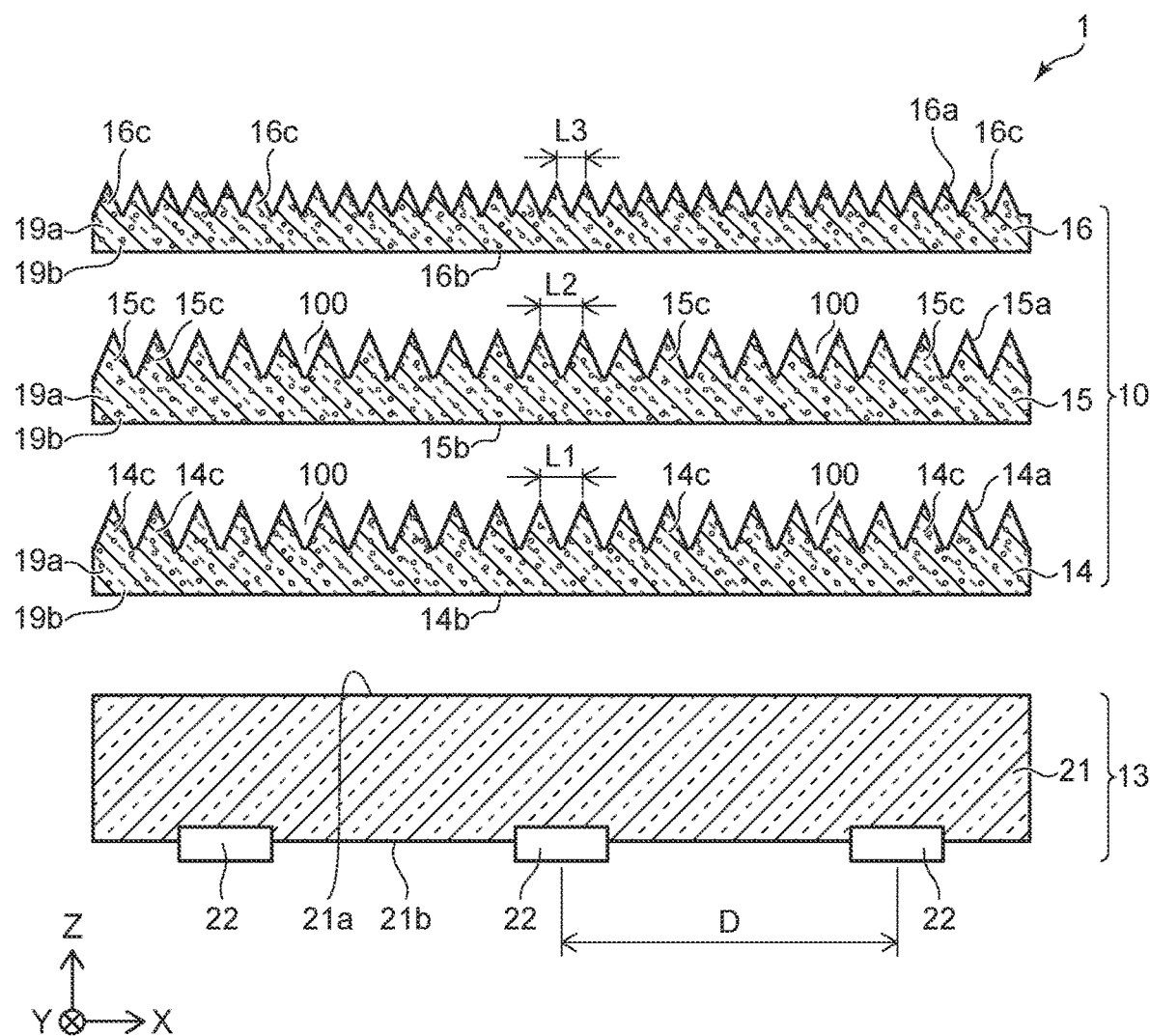
FIG. 2 is an exploded cross-sectional view schematically showing a planar light source and a light-diffusing sheet stacked body according to the first embodiment.

FIG. 2 is an exploded cross-sectional view schematically showing the planar light source 13 and the light-diffusing sheet stacked body 10 according to the present embodiment.

As shown in FIG. 2, the planar light source 13 includes a light guide plate 21 and a plurality of light sources 22. The light guide plate 21 includes an upper surface 21a and a lower surface 21b. The light sources 22 are located at the lower surface 21b side of the light guide plate 21. "The light source 22 being located at the lower surface 21b side of the light guide plate 21" means that the light source 22 is located lower than the thickness-direction center of the light guide plate 21, so that the entire light source 22 is positioned inside the light guide plate 21, or so that all or a portion of the light source 22 may be positioned lower than the lower surface 21b of the light guide plate 21. The detailed configuration of the planar light source 13 is described below.

The light-diffusing sheet stacked body 10 includes the first light-diffusing sheet 14 located on the light guide plate 21, the second light-diffusing sheet 15 located on the first light-diffusing sheet 14, and the third light-diffusing sheet 16 located on the second light-diffusing sheet 15. The first light-diffusing sheet 14, the second light-diffusing sheet 15, and the third light-diffusing sheet 16 (hereinbelow, also generally referred to as the "light-diffusing sheets") each include a plurality of light-diffusing materials 19b in a resin material 19a. The resin material 19a may include a polycarbonate resin; for example, the major component of the resin material 19a can be a polycarbonate resin. The light-diffusing material 19b can be, for example, particle of silicon oxide, titanium oxide, aluminum oxide, calcium carbonate, zinc oxide, lead carbonate, barium sulfate, etc, or combinations thereof. The component of the resin material 19a and the type of the light-diffusing material 19b may be the same or different between the light-diffusing sheets.

The first light-diffusing sheet 14 includes an upper surface 14a and a lower surface 14b. A plurality of first protrusions 14c are defined at the upper surface 14a of the first light-diffusing sheet 14. For example, the plurality of first protrusions 14c are arranged in a matrix configuration along the X-direction and the Y-direction. The shape of each first protrusion 14c can be a rectangular pyramid shape or a shape approximating a rectangular pyramid. The "shape approximating a rectangular pyramid" refers to a shape that is similar to a rectangular pyramid such as, for example, a rectangular pyramid having rounded corners and edges. The shape of the first protrusion 14c is not limited to a rectangular pyramid shape or a shape approximating a rectangular pyramid and can be, for example, a polygonal pyramid such as a triangular pyramid, a hexagonal pyramid, an octagonal pyramid, etc., or a shape that approximates these polygonal pyramids. It is favorable for the cross-sectional shape of the first protrusion 14c to be line-symmetric with respect to a center line perpendicular to the lower surface 14b of the first light-diffusing sheet 14. On the other hand, for example, the lower surface 14b of the first light-diffusing sheet 14 is flat.

Including the first protrusion 14c, the thickness of the first light-diffusing sheet 14 is, for example, not less than 100 μm and not more than 200 μm, e.g., 160 μm. The height of the first protrusion 14c is, for example, not less than 10 μm and not more than 100 μm, e.g., 50 μm. The percentage of the height of the first protrusion 14c in the thickness of the first light-diffusing sheet 14 including the first protrusion 14c is, for example, not less than 10% and not more than 50%. The width of the lower end of the first protrusion 14c is, for example, not less than 50 μm and not more than 200 μm, e.g., 100 μm. A distance L1 between the centers of adjacent first protrusions 14c is, for example, not less than 50 μm and not more than 200 μm, e.g., 100 μm.

The second light-diffusing sheet 15 includes an upper surface 15a and a lower surface 15b. The upper surface 15a of the second light-diffusing sheet 15 includes a plurality of second protrusions 15c. For example, the plurality of second protrusions 15c are arranged in a matrix configuration along the X-direction and the Y-direction. The shape of each second protrusion 15c can be a rectangular pyramid shape or a shape approximating a rectangular pyramid. However, the shape of the second protrusion 15c is not limited thereto, and can be, for example, a polygonal pyramid such as a triangular pyramid, a hexagonal pyramid, an octagonal pyramid, etc., or a shape that approximates these polygonal pyramids. It is favorable for the cross-sectional shape of the second protrusion 15c to be line-symmetric with respect to a center line perpendicular to the lower surface 15b of the second light-diffusing sheet 15. For example, the lower surface 15b of the second light-diffusing sheet 15 is flat.

Including the second protrusion 15c, the thickness of the second light-diffusing sheet 15 is, for example, not less than 100 μm and not more than 200 μm, e.g., 160 μm. The height of the second protrusion 15c is, for example, not less than 10 μm and not more than 100 μm, e.g., 50 μm. The percentage of the height of the second protrusion 15c in the thickness of the second light-diffusing sheet 15 including the second protrusion 15c is, for example, not less than 10% and not more than 50%. The width of the lower end of the second protrusion 15c is, for example, not less than 50 μm and not more than 200 μm, e.g., 100 μm. A distance L2 between the centers of adjacent second protrusions 15c is, for example, not less than 50 μm and not more than 200 μm, e.g., 100 μm.

The third light-diffusing sheet 16 includes an upper surface 16a and a lower surface 16b. The upper surface 16a of the third light-diffusing sheet 16 includes a plurality of third protrusions 16c. For example, the plurality of third protrusions 16c are arranged in a matrix configuration along the X-direction and the Y-direction. The shape of each third protrusion 16c can be a rectangular pyramid shape or a shape approximating a rectangular pyramid. However, the shape of the third protrusion 16c may be different from the shape of the first protrusion 14c and/or different from the shape of the second protrusion 15c. For example, the shape of the third protrusion 16c can be a polygonal pyramid such as a triangular pyramid, a rectangular pyramid, a hexagonal pyramid, an octagonal pyramid, etc., or a shape that approximates these polygonal pyramids that is shorter than the first protrusions 14c and/or the second protrusions 15c. Also, the width of the lower end may be less than that of the first protrusions 14c and/or that of the second protrusions 15c; or the distance between the centers of the third protrusions 16c may be less than the distance between the centers of the first protrusions 14c and/or the distance between the centers of the second protrusions 15c. The shape of the third protrusion 16c is not limited to a rectangular pyramid shape or a shape approximating a rectangular pyramid and can be, for example, a polygonal pyramid such as a triangular pyramid, a hexagonal pyramid, an octagonal pyramid, etc., or a shape that approximates these polygonal pyramids. For example, the lower surface 16b of the third light-diffusing sheet 16 is flat.

Including the third protrusion 16c, the thickness of the third light-diffusing sheet 16 is, for example, not less than 50 µm and not more than 150 µm, e.g., 100 µm. The height of the third protrusion 16c is, for example, not less than 2 µm and not more than 60 µm, e.g., 40 µm. A distance L3 between the centers of adjacent third protrusions 16c is, for example, not less than 50 µm and not more than 200 µm, e.g., 100 µm.

The first protrusion 14c, the second protrusion 15c, and the third protrusion 16c may be generally referred to as the "protrusions".

Because FIG. 2 is an exploded cross-sectional view, the members are illustrated as being separated from each other; however, actually, the vertices of the first protrusions 14c of the first light-diffusing sheet 14 contact the lower surface 15b of the second light-diffusing sheet 15; and the vertices of the second protrusions 15c of the second light-diffusing sheet 15 contact the lower surface 16b of the third light-diffusing sheet 16. A space 100 is between the adjacent first protrusions 14c and between the adjacent second protrusions 15c. Air is disposed in the space 100.

The first prism sheet 17 and the second prism sheet 18 are light-transmitting materials, e.g., transparent resin materials. It is favorable for the first prism sheet 17 and the second prism sheet 18 to substantially not include a light-diffusing material. It is favorable for the thicknesses of the first prism sheet 17 and the second prism sheet 18 each to be not less than 100 µm and not more than 200 µm, e.g., 150 µm. For example, prisms that extend in the X-direction are formed in the upper surface of the first prism sheet 17. For example, prisms that extend in the Y-direction are formed in the upper surface of the second prism sheet 18. It is favorable for the arrangement intervals of the prisms of the first prism sheet 17 and the second prism sheet 18 to be, for example, not less than 20 µm and not more than 100 µm, e.g., 24 µm.

Although the first prism sheet 17 and the second prism sheet 18 are used in the example shown in FIG. 2, one composite prism sheet that includes two different types of prisms may be used. Also, a prism sheet and a polarized sheet may be used in combination. A light-diffusing sheet may be disposed on a prism sheet or a polarized sheet.

The planar light source 13 will now be described.

As shown in FIG. 1, the planar light source 13 includes the plurality of light-emitting modules 20. In an example, 128 light-emitting modules 20 are arranged to be sixteen in the X-direction and eight in the Y-direction. The planar light source 13 also includes a pair of external terminals 13a.

Figure 3:
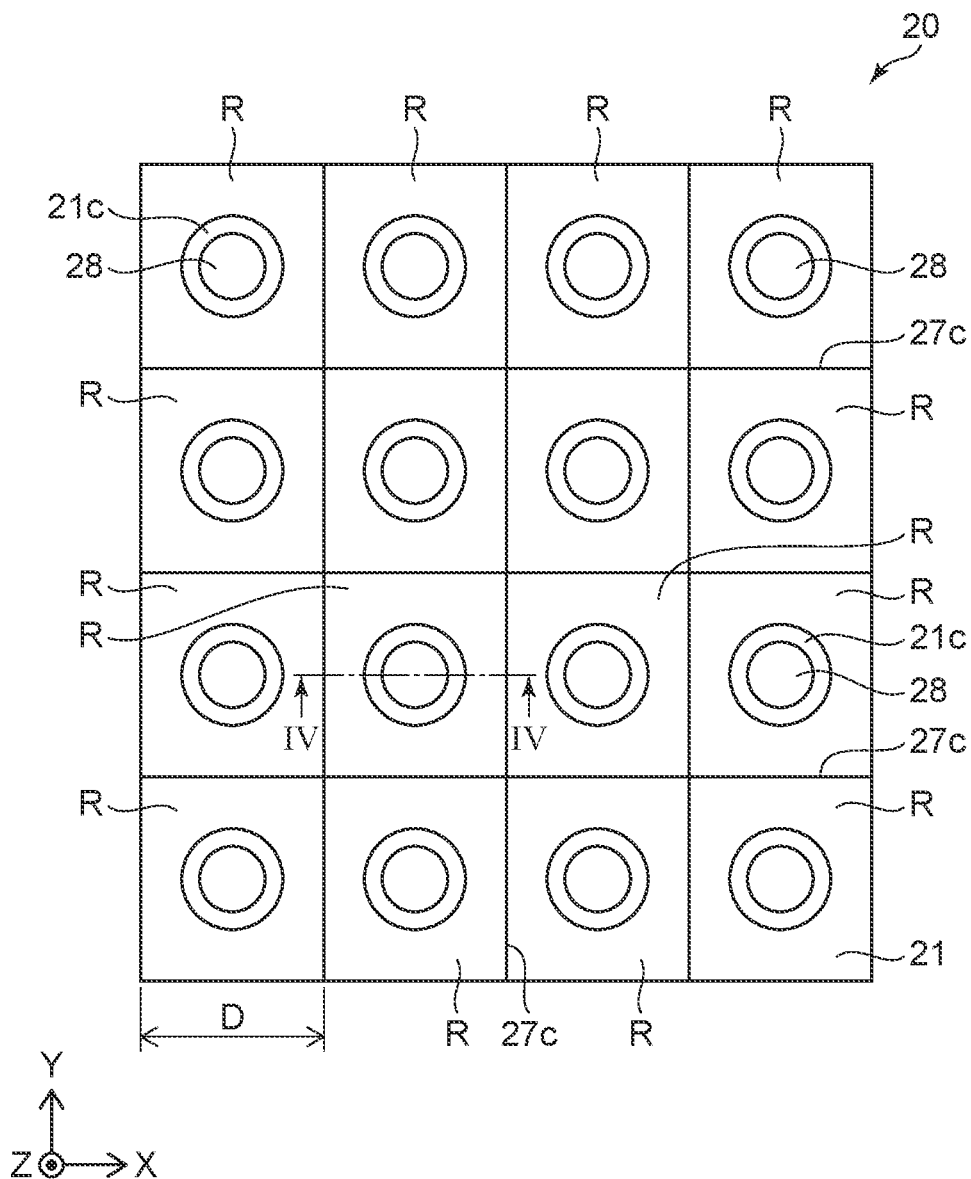
FIG. 3 is a plan view showing the light-emitting module according to the first embodiment.

FIG. 3 is a plan view showing the light-emitting module according to the present embodiment.

Figure 4:
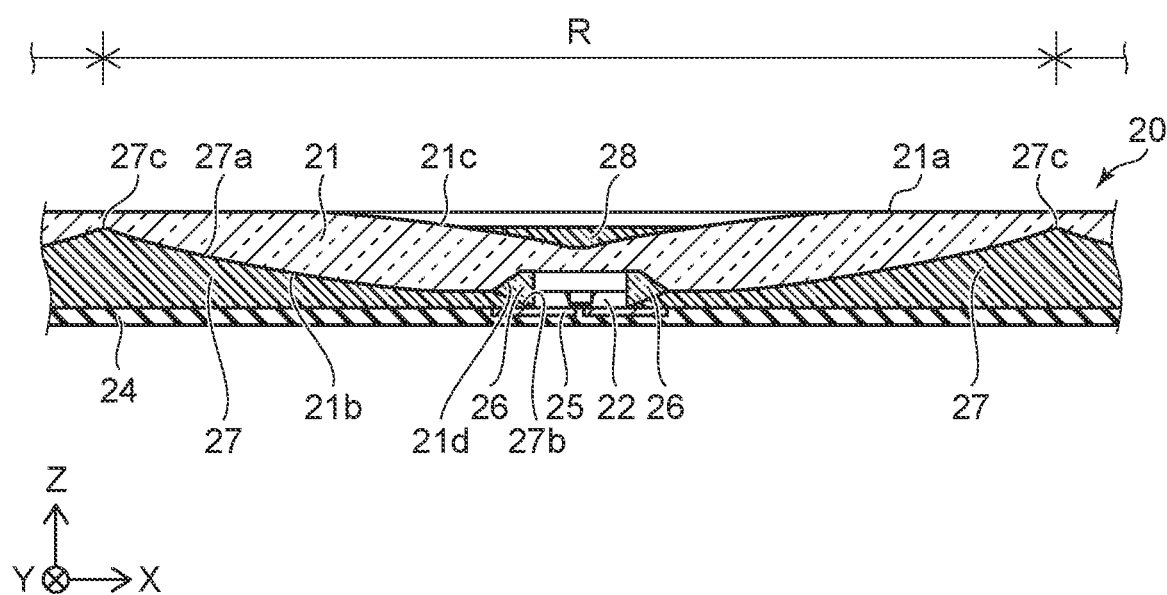
FIG. 4 is a cross-sectional view along line IV-IV shown in FIG. 3.

FIG. 4 is a cross-sectional view along line IV-IV shown in FIG. 3.

As shown in FIGS. 3 and 4, a plurality of light-emitting regions R are set in each light-emitting module 20. In an example, sixteen light-emitting regions R are arranged to be four in the X-direction and four in the Y-direction in each light-emitting module 20.

Each light-emitting module 20 includes one light guide plate 21; and each light-emitting region R includes one light source 22. Accordingly, in the example shown in FIGS. 3 and 4, one light guide plate 21 and sixteen light sources 22 are included in one light-emitting module 20. It is favorable for a distance D between the centers of the adjacent light sources 22, i.e., the arrangement spacing of the light-emitting regions R, to be not less than 1 mm and not more than 10 mm, e.g., 6 mm.

In the light-emitting module 20, the lower surface 21b of the light guide plate 21 includes a recess 21d; and the light source 22 is located in the recess 21d. A first light-transmitting member 26 is located between the sidewall of the recess 21c and the side surface of the light source 22. The light source 22 is fixed to the light guide plate 21 by the first light-transmitting member 26.

In the light-emitting module 20, a first light-reflective member 27 is disposed at the periphery of the light source 22 at the lower surface 21b side of the light guide plate 21. The first light-reflective member 27 is located below the first light-transmitting member 26 and at the side surface of the light source 22. A wiring layer 25 is disposed at the lower surfaces of the light source 22 and the first light-reflective member 27. The wiring layer 25 is patterned into a prescribed configuration. The light source 22 is connected to the wiring layer 25. An upper surface 27a of the first light-reflective member 27 includes a curved concave surface at each light-emitting region R. The upper surface 27a of the first light-reflective member 27 includes ridgelines 27c at the portions corresponding to the boundaries of the adjacent light-emitting regions R.

The recess 21c is defined in the region of the upper surface 21a of the light guide plate 21 corresponding to the region directly above the light source 22; and a light-modulating member 28 is disposed in the recess 21c. The recess 21c is, for example, a truncated circular cone. The light-modulating member 28 is, for example, a resin material including a light-diffusing material that diffusely reflects a portion of the incident light and transmits another portion of the incident light.

Figure 5A:
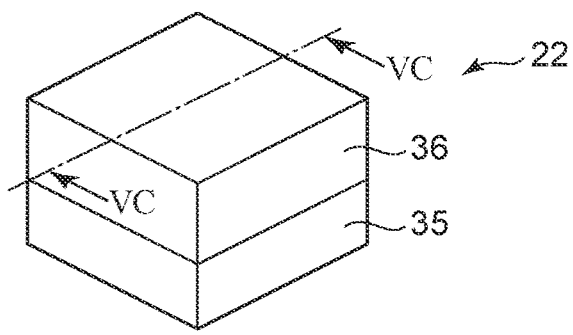
FIGS. 5A and 5B are perspective views showing a light source according to the first embodiment.
Figure 5B:
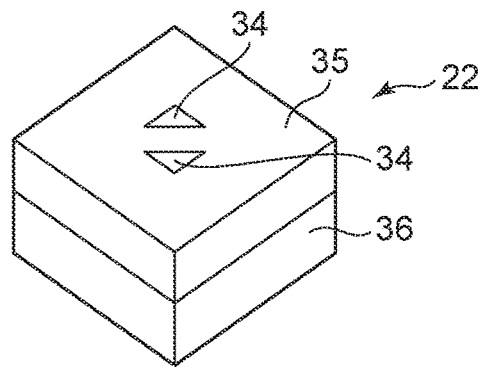
Figure 5C:
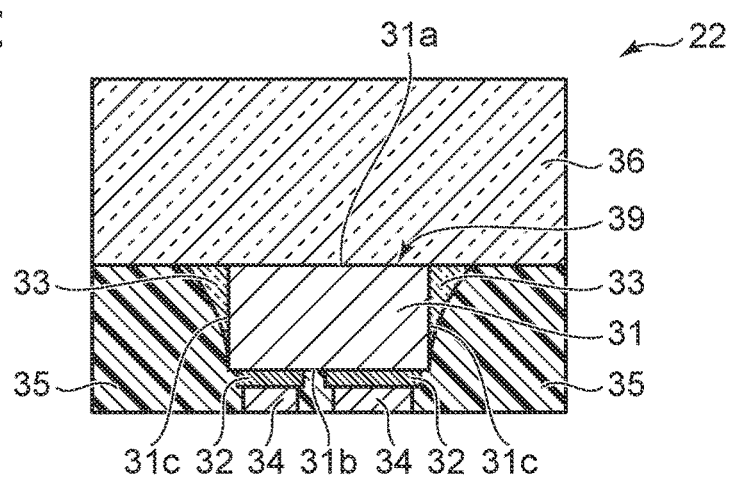
FIG. 5C is a cross-sectional view along line VC-VC shown in FIG. 5A.
Figure 5D:
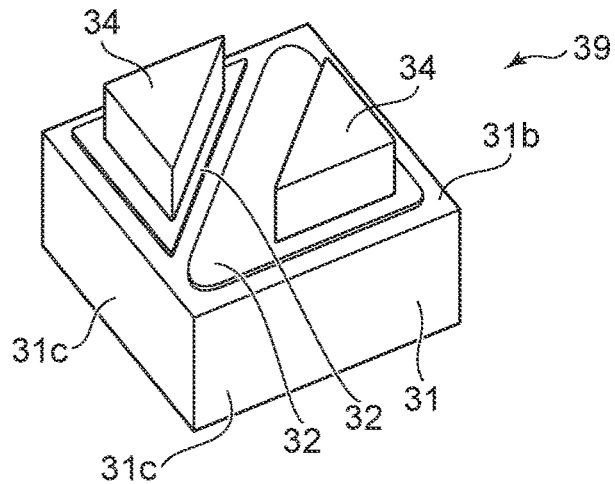
FIG. 5D is a perspective view showing a light-emitting element and conductive members according to the first embodiment.

FIGS. 5A and 5B are perspective views showing the light source 22 according to the present embodiment; FIG. 5C is a cross-sectional view along line VC-VC shown in FIG. 5A; and FIG. 5D is a perspective view showing a light-emitting element 39 and a conductive member 34 according to the present embodiment.

As shown in FIGS. 5A to 5D, the light source 22 includes the light-emitting element 39, a second light-reflective member 35, and a third light-transmitting member 36. The light-emitting element includes a semiconductor structure body 31, a pair of conductive members 32, and a pair of electrodes 34. The light-emitting element 39 is located in the second light-reflective member 35. The third light-transmitting member 36 is located on the second light-reflective member 35.

The semiconductor structure body 31 includes an upper surface 31a, a lower surface 31b, and four side surfaces 31c. A p-type layer, a light-emitting layer, and an n-type layer are stacked in the semiconductor structure body 31. The pair of conductive members 32 is located at the lower surface 31b of the semiconductor structure body 31 and is connected respectively to the p-type layer and the n-type layer of the semiconductor structure body 31. The pair of electrodes 34 is connected respectively to the pair of conductive members 32 and is exposed at the lower surface of the second light-reflective member 35. The pair of electrodes 34 is connected to the wiring layer 25. A second light-transmitting member 33 contacts the lower surface of the third light-transmitting member 36 and covers the side surfaces 31c of the semiconductor structure body 31.

The third light-transmitting member 36 may include a fluorescent material. In such a case, the third light-transmitting member 36 functions as a light conversion member that converts the incident light into light of another wavelength. The third light-transmitting member 36 may not include a fluorescent material. In such a case, for example, a fluorescent material sheet can be disposed above the light-diffusing sheet stacked body 10, e.g., between the third light-diffusing sheet 16 and the first prism sheet 17. Alternatively, a fluorescent material need not be disposed for the entire display device 1.

Operations of the display device 1 according to the present embodiment will now be described.

When electrical power is applied to the pair of external terminals 13a of the planar light source 13 as shown in FIG. 1, the electrical power is applied to the pair of electrodes 34 of the light source 22 via the wiring layer 25 and is applied to the p-type layer and the n-type layer of the semiconductor structure body 31 via the pair of conductive members 32 as shown in FIGS. 4 to 5D. Accordingly, the semiconductor structure body 31 emits light; and the light that is emitted from the semiconductor structure body 31 is emitted from the light source 22 via the third light-transmitting member 36. The light that is emitted from the light source 22 spreads along the XY plane through the light guide plate 21 while being reflected by the side surface of the light-modulating member 28 and the upper surface 27a of the first light-reflective member 27, and is emitted from the upper surface 21a of the light guide plate 21.

As shown in FIGS. 1 and 2, the light that is emitted from the upper surface 21a of the light guide plate 21 reaches the lower surface 14b of the first light-diffusing sheet 14. A portion of the light that reaches the lower surface 14b enters the first light-diffusing sheet 14 through the lower surface 14b and is emitted from the upper surface 14a. At this time, the light is refracted at the side surface of the first protrusion 14c; and the propagation direction changes to a direction that is oblique to the Z-direction. Accordingly, the propagation direction of the light is dispersed. Another portion of the light that reaches the lower surface 14b of the first light-diffusing sheet 14 is reflected by the lower surface 14b and returns to the light guide plate 21.

The light that is emitted from the first light-diffusing sheet 14 reaches the lower surface 15b of the second light-diffusing sheet 15. A portion of the light that reaches the lower surface 15b enters the second light-diffusing sheet 15 through the lower surface 15b and is emitted from the upper surface 15a. At this time, the light is refracted at the side surface of the second protrusion 15c; and the propagation direction changes. Accordingly, the propagation direction of the light is further dispersed. Another portion of the light that reaches the lower surface 15b of the second light-diffusing sheet 15 from the first light-diffusing sheet 14 is reflected by the lower surface 15b and returns to the first light-diffusing sheet 14. This portion of the light is re-reflected by the side surface of the first protrusion 14c of the first light-diffusing sheet 14 and reaches the second light-diffusing sheet 15. The propagation direction of the light is dispersed at this time as well.

The light that is emitted from the second light-diffusing sheet 15 reaches the lower surface 16b of the third light-diffusing sheet 16. A portion of the light that reaches the lower surface 16b enters the third light-diffusing sheet 16 through the lower surface 16b and is emitted from the upper surface 16a. At this time, the light is refracted at the side surface of the third protrusion 16c; and the propagation direction is further dispersed. Another portion of the light that reaches the lower surface 16b of the third light-diffusing sheet 16 from the second light-diffusing sheet 15 is reflected by the lower surface 16b and returns to the second light-diffusing sheet 15. This portion of the light is re-reflected by the side surface of the second protrusion 15c of the second light-diffusing sheet 15 and reaches the third light-diffusing sheet 16. The propagation direction of the light is dispersed at this time as well.

The light that is emitted from the third light-diffusing sheet 16 reaches the lower surface of the first prism sheet 17. A portion of the light that reaches the lower surface of the first prism sheet 17 enters the first prism sheet 17 and is emitted from the upper surface of the first prism sheet 17. Another portion of the light that reaches the lower surface of the first prism sheet 17 is reflected and returns to the third light-diffusing sheet 16. This portion of the light is re-reflected by the side surface of the third protrusion 16c of the third light-diffusing sheet 16 and reaches the first prism sheet 17. The propagation direction of the light is dispersed at this time as well. The light that is emitted from the first prism sheet 17 enters the second prism sheet 18 and is emitted from the upper surface of the second prism sheet 18. This allows for increasing the uniformity of the light that is emitted from the display device 1.

In the display device 1, with the upper surface 14a of the first light-diffusing sheet 14 including the first protrusion 14c, the light that is reflected at the lower surface 15b of the second light-diffusing sheet 15 is reflected in various directions at the side surface of the first protrusion 14c of the first light-diffusing sheet 14 and again returns to the second light-diffusing sheet 15. Similarly, with the upper surface 15a of the second light-diffusing sheet 15 including the second protrusion 15c, the light that is reflected at the lower surface 16b of the third light-diffusing sheet 16 is reflected in various directions at the side surface of the second protrusion 15c of the second light-diffusing sheet 15 and again returns to the third light-diffusing sheet 16. Also, with the upper surface 16a of the third light-diffusing sheet 16 including the third protrusion 16c, the light that is reflected at the lower surface of the first prism sheet 17 is reflected in various directions at the side surface of the third protrusion 16c of the third light-diffusing sheet 16 and again returns to the first prism sheet 17. Therefore, the light-diffusing sheet stacked body 10 has a high transmission efficiency of the light and high uniformity of the transmitted light. Accordingly, in the display device 1, the light extraction efficiency is high, and the uniformity of the luminance is high.

The shape of the third protrusion 16c may be different from the shape of the first protrusion 14c and/or the shape of the second protrusion 15c in the light-diffusing sheet stacked body 10, which allows for reducing the occurrence of regularity in the propagation direction of the light in the light-diffusing sheet stacked body 10. Also this structure allows for increasing the uniformity of the light.

In the light-diffusing sheet stacked body 10, the vertices of the first protrusions 14c of the first light-diffusing sheet 14 contact the lower surface 15b of the second light-diffusing sheet 15; and the space 100 is between the first protrusions 14c. Similarly, the vertices of the second protrusions 15c of the second light-diffusing sheet 15 contact the lower surface 16b of the third light-diffusing sheet 16; and the space 100 is between the second protrusions 15c. Thus, with the space 100 present between the light-diffusing sheets, the uniformity of the light can be further improved without increasing the amount of the light-diffusing material in the light-diffusing sheets; and contact between the light-diffusing sheets allows for reducing a thickness of the light-diffusing sheet stacked body 10. This allows for further improving the uniformity of the luminance of the display device 1, and reducing a thickness of the display device 1.

In the light-emitting module 20, the light-modulating member 28 is located in the region directly above the light source 22. Therefore, the light that is emitted upward from the light source 22 is reflected in a direction along the XY plane by the side surface of the light-modulating member 28. Then, the light that reaches the concave upper surface 27a of the first light-reflective member 27 is oriented toward the upper surface 21a of the light guide plate 21. Therefore, the uniformity of the light emitted from the light guide plate 21 is high.

Although an example is shown in the present embodiment in which the shape of the third protrusion 16c of the third light-diffusing sheet 16 is different from the shape of the first protrusion 14c of the first light-diffusing sheet 14 and the shape of the second protrusion 15c of the second light-diffusing sheet 15 for the three light-diffusing sheets included in the light-diffusing sheet stacked body 10, the configuration is not limited thereto. For example, the shape of the first protrusion 14c may be different from the shape of the second protrusion 15c and/or the shape of the third protrusion 16c. In such a case, for example, the first protrusion 14c can be shorter than the second protrusion 15c and/or the third protrusion 16c. Also, the width of the lower end of the first protrusion 14c may be less than that of the second protrusion 15c and/or that of the third protrusion 16c; and the distance between the centers of the first protrusions 14c may be less than the distance between the centers of the second protrusions 15c and/or the distance between the centers of the third protrusions 16c.

The shape of the second protrusion 15c may be different from the shape of the first protrusion 14c and/or the shape of the third protrusion 16c. In such a case, for example, the second protrusion 15c can be shorter than the first protrusion 14c and/or the third protrusion 16c. The width of the lower end of the second protrusion 15c may be less than that of the first protrusion 14c and/or that of the third protrusion 16c; and the distance between the centers of the second protrusions 15c may be less than the distance between the centers of the first protrusions 14c and/or the distance between the centers of the third protrusions 16c.

The shape of the first protrusion 14c, the shape of the second protrusion 15c, and the shape of the third protrusion 16c may be different from each other. In such a case, the first protrusion 14c, the second protrusion 15c, and the third protrusion 16c may have different heights. Also, the width of the lower end may be different between the first protrusion 14c, the second protrusion 15c, and the third protrusion 16c; and the distance between the centers may be different between the first protrusion 14c, the second protrusion 15c, and the third protrusion 16c.

Second Embodiment

A second embodiment will now be described.

In embodiments described below, the differences from the first embodiment are mainly described, and a description of portions similar to those of the first embodiment is omitted or simplified.

Figure 6:
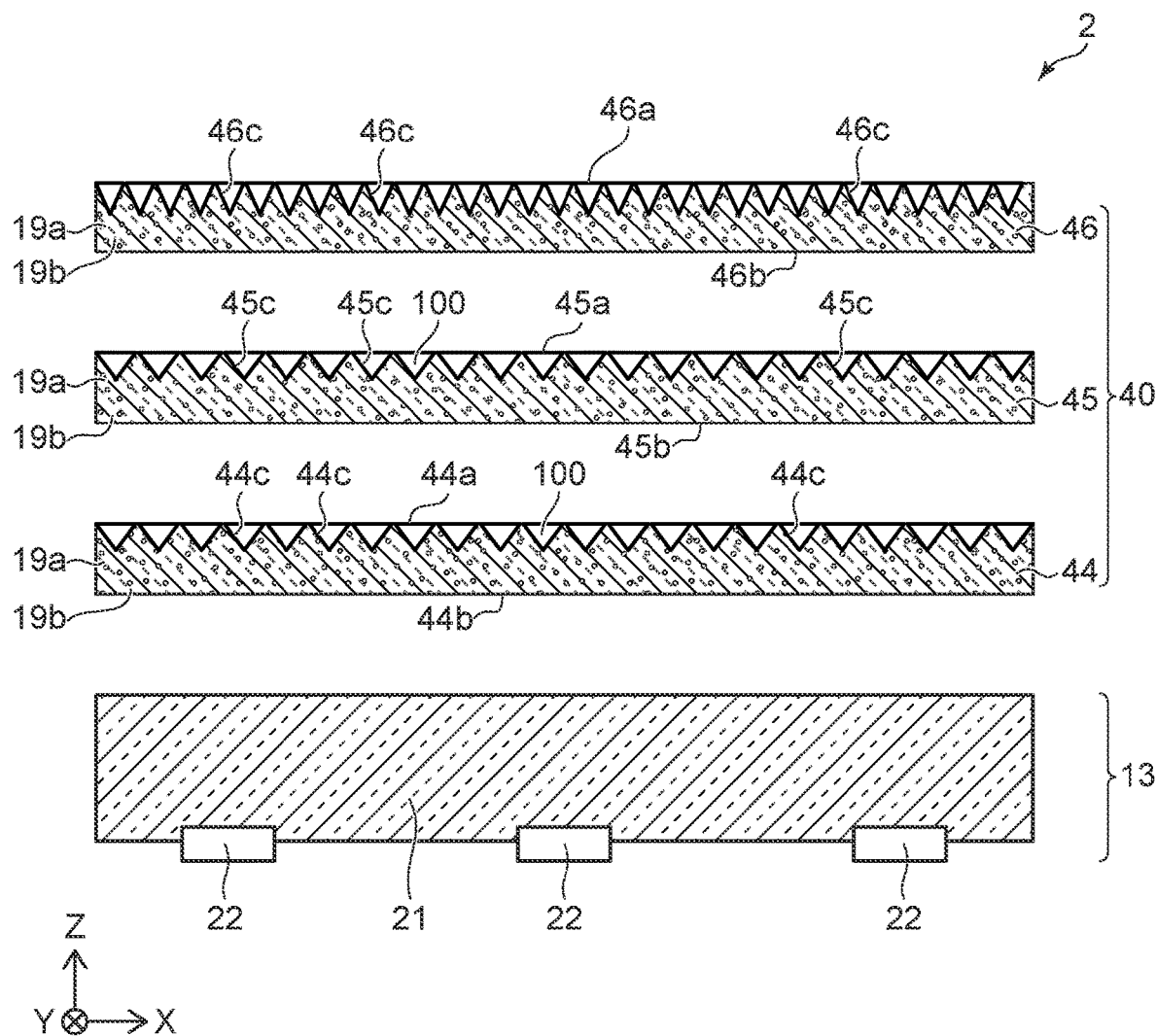
FIG. 6 is an exploded cross-sectional view schematically showing a planar light source and a light-diffusing sheet stacked body according to a second embodiment of the present disclosure.

FIG. 6 is an exploded cross-sectional view schematically showing the planar light source 13 and a light-diffusing sheet stacked body 40 according to the present embodiment.

The light-diffusing sheet stacked body 40 according to the present embodiment differs from the light-diffusing sheet stacked body 10 according to the first embodiment in that recesses are defined instead of protrusions in each light-diffusing sheet.

As shown in FIG. 6, the planar light source 13, the light-diffusing sheet stacked body 40, the first prism sheet 17, and the second prism sheet 18 are disposed in a display device 2 according to the present embodiment. The configurations of the planar light source 13, the first prism sheet 17, and the second prism sheet 18 are similar to those of the first embodiment.

A first light-diffusing sheet 44, a second light-diffusing sheet 45, and a third light-diffusing sheet 46 are stacked in this order in the light-diffusing sheet stacked body 40. The first light-diffusing sheet 44, the second light-diffusing sheet 45, and the third light-diffusing sheet 46 (hereinbelow, also generally referred to as the "light-diffusing sheet") each include the plurality of light-diffusing materials 19b in the resin material 19a. The resin material 19a includes, for example, a polycarbonate resin; for example, the major component of the resin material 19a is a polycarbonate resin. The light-diffusing material 19b can be, for example, a particle of silicon oxide, titanium oxide, etc.

The first light-diffusing sheet 44 includes an upper surface 44a and a lower surface 44b. A plurality of first recesses 44c are defined in the upper surface 44a of the first light-diffusing sheet 44. For example, the plurality of first recesses 44c are arranged in a matrix configuration along the X-direction and the Y-direction. For example, the shape of the first recess 44c can be a rectangular pyramid shape or a shape approximating a rectangular pyramid. However, the shape of the first recess 44c is not limited to a rectangular pyramid shape or a shape approximating a rectangular pyramid, and can be, for example, a polygonal pyramid such as a triangular pyramid, a hexagonal pyramid, an octagonal pyramid, etc., or a shape that approximates these polygonal pyramids. On the other hand, for example, the lower surface 44b of the first light-diffusing sheet 44 is flat.

Similarly, the second light-diffusing sheet 45 includes an upper surface 45a and a lower surface 45b. A plurality of second recesses 45c are defined in the upper surface 45a of the second light-diffusing sheet 45. For example, the plurality of second recesses 45c are arranged in a matrix configuration along the X-direction and the Y-direction. The shape of the second recess 45c can be, for example, a rectangular pyramid shape or a shape approximating a rectangular pyramid. However, the shape of the second recess 45c is not limited to a rectangular pyramid shape or a shape approximating a rectangular pyramid, and can be, for example, a polygonal pyramid such as a triangular pyramid, a hexagonal pyramid, an octagonal pyramid, etc., or a shape that approximates these polygonal pyramids. For example, the lower surface 45b of the second light-diffusing sheet 45 is flat.

The third light-diffusing sheet 46 includes an upper surface 46a and a lower surface 46b. A plurality of third recesses 46c are defined in the upper surface 46a of the third light-diffusing sheet 46. For example, the plurality of third recesses 46c are arranged in a matrix configuration along the X-direction and the Y-direction. The shape of the third recess 46c can be, for example, a rectangular pyramid shape or a shape approximating a rectangular pyramid. However, the shape of the third recess 46c is not limited to a rectangular pyramid shape or a shape approximating a rectangular pyramid and can be, for example, a polygonal pyramid such as a triangular pyramid, a hexagonal pyramid, an octagonal pyramid, etc., or a shape that approximates these polygonal pyramids. The shape of the third recess 46c may be different from the shape of the first recess 44c and/or the shape of the second recess 45c. For example, the third recess 46c can be deeper than the first recess 44c and/or the second recess 45c. Also, the width of the opening of the third recess 46c may be less than that of the first recess 44c and/or the second recess 45c; and the distance between the centers of the third recesses 46c may be less than the distance between the centers of the first recesses 44c and/or the distance between the centers of the second recesses 45c. For example, the lower surface 46b of the third light-diffusing sheet 46 is flat.

Hereinbelow, the first recess 44c, the second recess 45c, and the third recess 46c may be generally referred to as the "recesses".

The upper surface 44a of the first light-diffusing sheet 44 contacts the lower surface 45b of the second light-diffusing sheet 45; and the space 100 is in the first recess 44c. The upper surface 45a of the second light-diffusing sheet 45 contacts the lower surface 46b of the third light-diffusing sheet 46; and the space 100 is in the second recess 45c.

According to the present embodiment as well, effects similar to those of the first embodiment can be obtained.

Although an example is shown in the present embodiment in which the shape of the third recess 46c of the third light-diffusing sheet 46 is different from the shape of the first recess 44c of the first light-diffusing sheet 44 and the shape of the second recess 45c of the second light-diffusing sheet 45 for the three light-diffusing sheets included in the light-diffusing sheet stacked body 40, the configuration is not limited thereto. For example, the shape of the first recess 44c may be different from the shape of the second recess 45c and/or the shape of the third recess 46c. In such a case, the first recess 44c can be deeper than the second recess 45c and/or the third recess 46c. Also, the width of the opening of the first recess 44c may be less than that of the second recess 45c and/or the third recess 46c; and the distance between the centers of the first recesses 44c may be less than the distance between the centers of the second recesses 45c and/or the distance between the centers of the third recesses 46c.

The shape of the second recess 45c may be different from the shape of the first recess 44c and/or the shape of the third recess 46c. In such a case, for example, the second recess 45c can be deeper than the first recess 44c and/or the third recess 46c. Also, the width of the opening of the second recess 45c can be narrower than that of the first recess 44c and/or the third recess 46c; and the distance between the centers of the second recesses 45c may be less than the distance between the centers of the first recesses 44c and/or the distance between the centers of the third recesses 46c.

The shape of the first recess 44c, the shape of the second recess 45c, and the shape of the third recess 46c may be different from each other. In such a case, the depth can be different between the first recess 44c, the second recess 45c, and the third recess 46c. Also, the width of the opening may be different between the first recess 44c, the second recess 45c, and the third recess 46c; and the distance between the centers may be different between the first recess 44c, the second recess 45c, and the third recess 46c.

Third Embodiment

A third embodiment will now be described.

Figure 7:
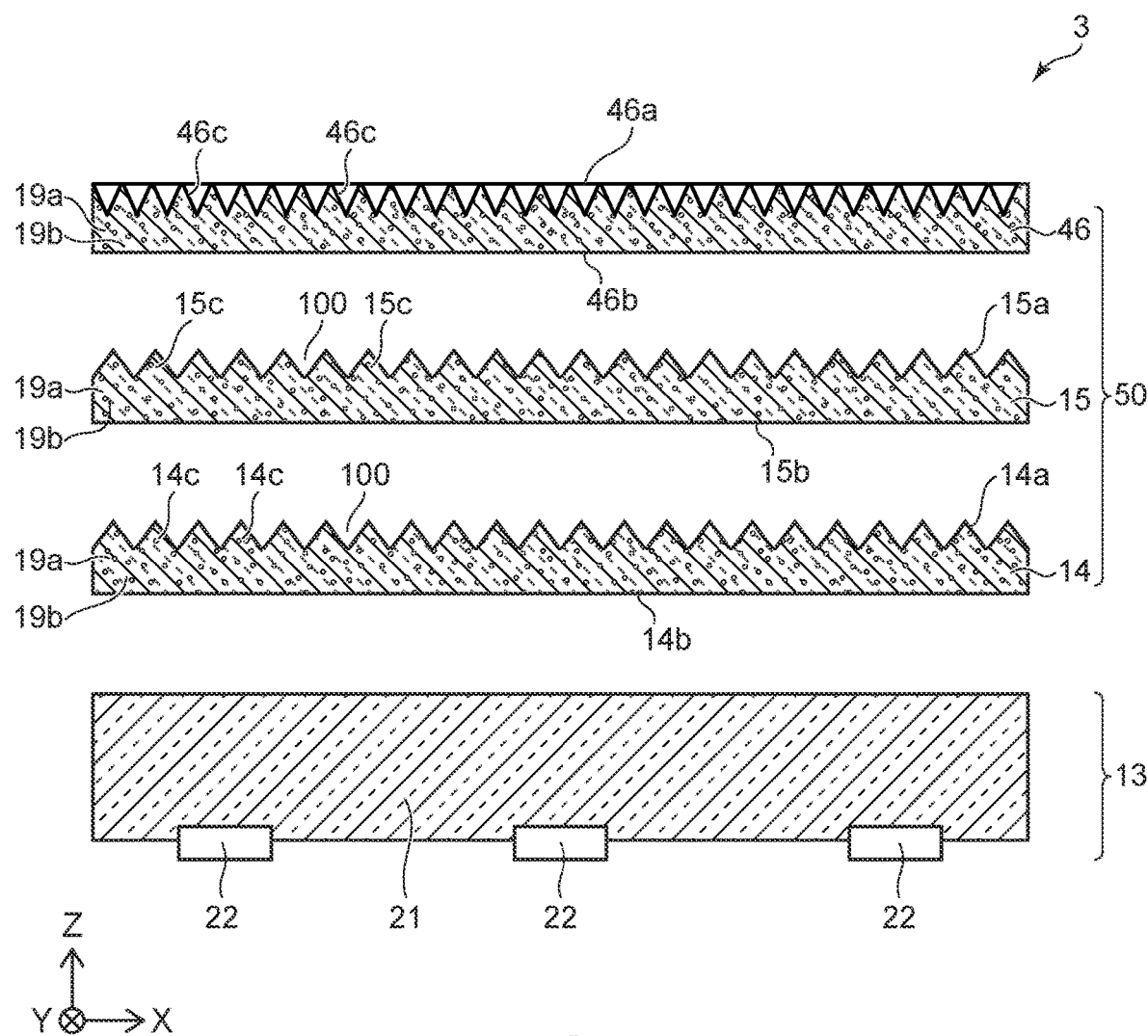
FIG. 7 is an exploded cross-sectional view schematically showing a planar light source and a light-diffusing sheet stacked body according to a third embodiment of the present disclosure.

FIG. 7 is an exploded cross-sectional view schematically showing the planar light source 13 and a light-diffusing sheet stacked body 50 according to the present embodiment.

In the light-diffusing sheet stacked body 50 according to the present embodiment, light-diffusing sheets in which protrusions are defined and a light-diffusing sheet in which recesses are defined coexist.

As shown in FIG. 7, the planar light source 13, the light-diffusing sheet stacked body 50, the first prism sheet 17, and the second prism sheet 18 are disposed in a display device 3 according to the present embodiment. The configurations of the planar light source 13, the first prism sheet 17, and the second prism sheet 18 are similar to those of the first embodiment.

The first light-diffusing sheet 14, the second light-diffusing sheet 15, and the third light-diffusing sheet 46 are stacked in this order in the light-diffusing sheet stacked body 50. As described in the first and second embodiments, the upper surface 14a of the first light-diffusing sheet 14 includes the plurality of first protrusions 14c; the upper surface 15a of the second light-diffusing sheet 15 includes the plurality of second protrusions 15c; and the upper surface 46a of the third light-diffusing sheet 46 includes the plurality of third recesses 46c. This allows for obtaining effects similar to those of the first embodiment.

The combination of light-diffusing sheets including the protrusions and the light-diffusing sheets including the recesses is not limited to that of the present embodiment. As examples in which two light-diffusing sheets including protrusions and one light-diffusing sheet including recesses are combined, the first light-diffusing sheet 14 that includes the first protrusion 14c, the second light-diffusing sheet 45 that includes the second recess 45c, and the third light-diffusing sheet 16 that includes the third protrusion 16c may be stacked in this order; and the first light-diffusing sheet 44 that includes the first recess 44c, the second light-diffusing sheet 15 that includes the second protrusion 15c, and the third light-diffusing sheet 16 that includes the third protrusion 16c may be stacked in this order.

As examples in which one light-diffusing sheet including protrusions and two light-diffusing sheets including recesses are combined, the first light-diffusing sheet 14 that includes the first protrusion 14c, the second light-diffusing sheet 45 that includes the second recess 45c, and the third light-diffusing sheet 46 that includes the third recess 46c may be stacked in this order. Also, the first light-diffusing sheet 44 that includes the first recess 44c, the second light-diffusing sheet 15 that includes the second protrusion 15c, and the third light-diffusing sheet 46 that includes the third recess 46c may be stacked in this order; and the first light-diffusing sheet 44 that includes the first recess 44c, the second light-diffusing sheet 45 that includes the second recess 45c, and the third light-diffusing sheet 16 that includes the third protrusion 16c may be stacked in this order.

Fourth Embodiment

A fourth embodiment will now be described.

Figure 8:
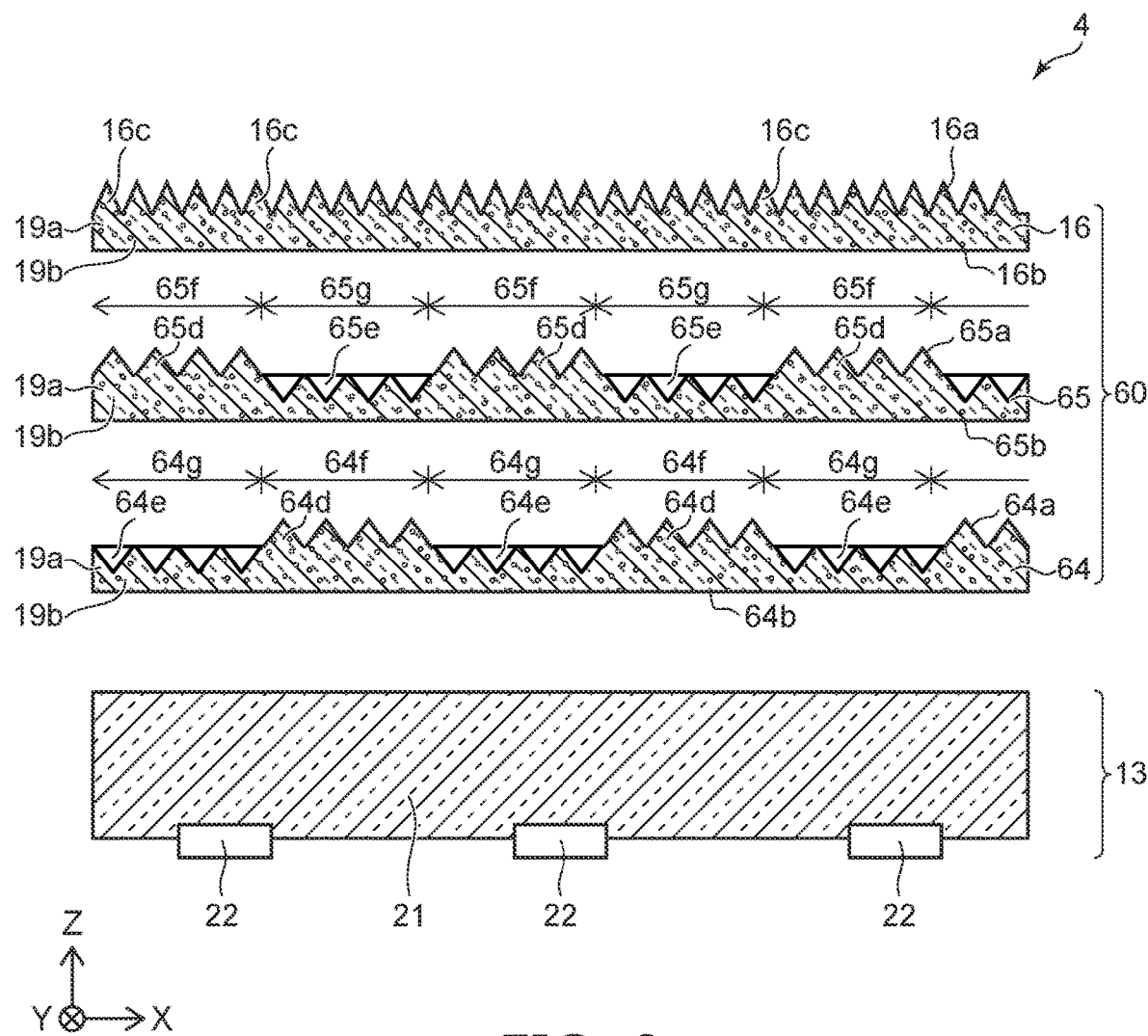
FIG. 8 is an exploded cross-sectional view schematically showing a planar light source and a light-diffusing sheet stacked body according to a fourth embodiment of the present disclosure.

FIG. 8 is an exploded cross-sectional view schematically showing the planar light source 13 and a light-diffusing sheet stacked body 60 according to the present embodiment.

In the light-diffusing sheet stacked body 60 according to the present embodiment, at least one light-diffusing sheet includes a protrusion region including protrusions and a recess region including recesses.

As shown in FIG. 8, the planar light source 13, the light-diffusing sheet stacked body 60, the first prism sheet 17, and the second prism sheet 18 are disposed in a display device 4 according to the present embodiment. The configurations of the planar light source 13, the first prism sheet 17, and the second prism sheet 18 are similar to those of the first embodiment.

A first light-diffusing sheet 64, a second light-diffusing sheet 65, and the third light-diffusing sheet 16 are stacked in this order in the light-diffusing sheet stacked body 60. The configuration of the third light-diffusing sheet 16 is similar to that of the third light-diffusing sheet 16 according to the first embodiment. In the first light-diffusing sheet 64 and the second light-diffusing sheet 65, for example, the plurality of light-diffusing materials 19b are included in the resin material 19a such as a polycarbonate resin, etc.

The first light-diffusing sheet 64 includes an upper surface 64a and a lower surface 64b. The upper surface 64a of the first light-diffusing sheet 64 includes a protrusion region 64f that includes a first protrusion 64d, and a recess region 64g that includes a first recess 64e. For example, the protrusion region 64f and the recess region 64g are alternately arranged along the X-direction and the Y-direction. For example, the regions may have a checkered pattern or may be arranged in a concentric circular configuration. On the other hand, for example, the lower surface 64b is flat.

The configuration of the second light-diffusing sheet 65 is similar to the configuration of the first light-diffusing sheet 64. Namely, the second light-diffusing sheet 65 includes an upper surface 65a and a lower surface 65b. The upper surface 65a of the second light-diffusing sheet 65 includes a protrusion region 65f that includes a second protrusion 65d, and a recess region 65g that includes a second recess 65e. For example, the protrusion region 65f and the recess region 65g are alternately arranged along the X-direction and the Y-direction. Also, for example, the regions may have a checkered pattern or may be arranged in a concentric circular configuration. On the other hand, for example, the lower surface 65b is flat.

For example, the recess region 65g of the second light-diffusing sheet 65 may be located in the region directly above the protrusion region 64f of the first light-diffusing sheet 64; and the protrusion region 65f of the second light-diffusing sheet 65 may be located in the region directly above the recess region 64g of the first light-diffusing sheet 64. According to the present embodiment as well, effects similar to those of the first embodiment can be obtained.

Among the light-diffusing sheets included in the light-diffusing sheet stacked body, the number of light-diffusing sheets in which the protrusion region and the recess region coexist may be one, two, or three.

Thus, in the light-diffusing sheet stacked bodies according to embodiments described above, three light-diffusing sheets that include a light-diffusing material in a resin material are stacked; and a protrusion or a recess is defined in the front surfaces of the three light-diffusing sheets. Also, among the three light-diffusing sheets, the shape of the protrusion or recess defined in the front surfaces of the two light-diffusing sheets is different from the shape of the protrusion or recess defined in the front surface of the remaining one light-diffusing sheet.

Fifth Embodiment

A fifth embodiment will now be described.

The configuration of the light-emitting module of a display device 5 according to the present embodiment is different from that of the display device 1 according to the first embodiment.

Figure 9:
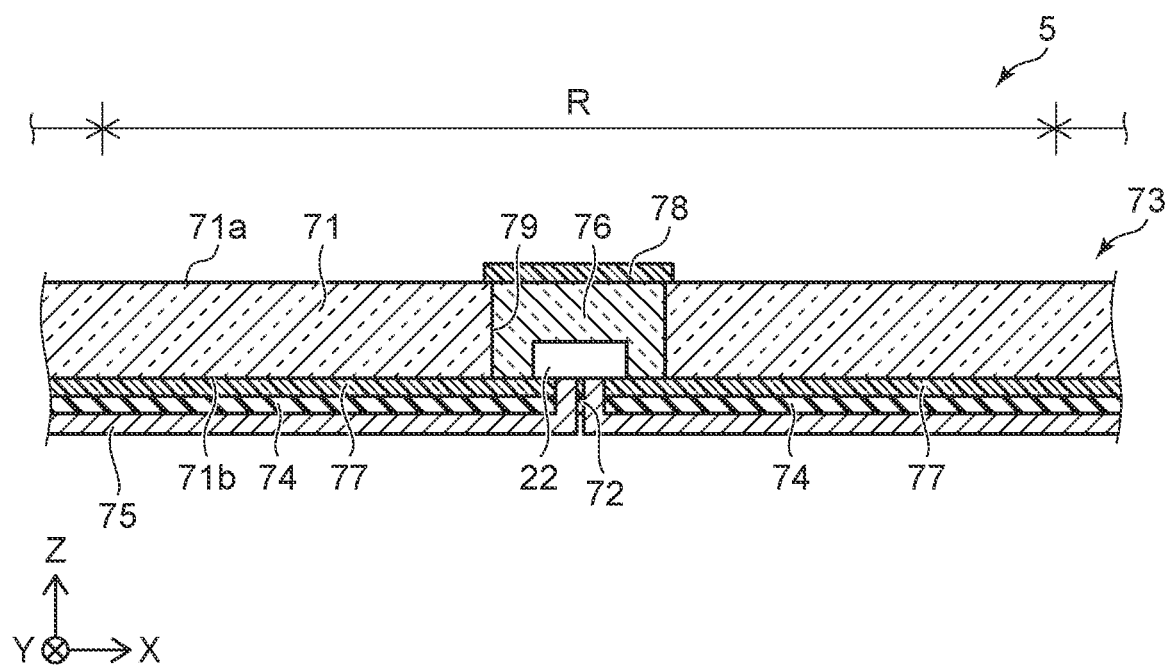
FIG. 9 is a cross-sectional view showing a light-emitting module according to a fifth embodiment of the present disclosure.

FIG. 9 is a cross-sectional view showing the light-emitting module according to the present embodiment.

As shown in FIG. 9, a light-emitting module 73 is disposed in the display device 5 according to the present embodiment.

A substrate 74 is disposed in the light-emitting module 73; a first light-reflective member 77 is disposed on the substrate 74; and a light guide plate 71 is disposed on the first light-reflective member 77. The light guide plate 71 includes an upper surface 71a and a lower surface 71b. For example, the upper surface 71a and the lower surface 71b of the light guide plate 71 are flat. The lower surface 71b of the light guide plate 71 contacts the first light-reflective member 77. A wiring layer 75 is disposed at the lower surface of the substrate 74. The wiring layer 75 is patterned into a prescribed configuration.

A through-hole 79 extends through the light guide plate 71 in the Z-direction. The opening shape of the through-hole 79 is, for example, circular. However, the opening shape of the through-hole 79 may be a polygonal shape such as a rectangle, an octagon, etc. The light source 22 is located in the through-hole 79. A via hole 72 that extends through the first light-reflective member 77 and the substrate 74 in the Z-direction is defined directly under the light source 22; and a conductive material is filled into the via hole 72. The light source 22 is connected to the wiring layer 75 by the conductive material located in the via hole 72. A first light-transmitting member 76 is disposed in the through-hole 79 to cover the light source 22. A light-modulating member 78 is disposed on the first light-transmitting member 76. The light-modulating member 78 is, for example, a resin material that includes a light-diffusing material, diffusely reflects a portion of the incident light, and transmits another portion of the incident light. The light-modulating member 78 is, for example, discal. A groove may be defined in the region of the upper surface 71a of the light guide plate 71 corresponding to the boundary of the light-emitting regions R. This allows for optically demarcating the adjacent light-emitting regions R from each other. Other configurations and the effects in the present embodiment are similar to those of the first embodiment.

The configuration of the light source 22 is not limited to the examples described above. For example, the light source 22 can include only the light-emitting element 39. Also, the light source 22 may include two or more types of fluorescent materials.

Test Example

A test example that shows the effects of the first embodiment described above will now be described.

In the test example, four types of display devices were made and lit, and the appearance was evaluated. The evaluation of the appearance was performed by a score of 1 to 5 by visual inspection, in which the score was higher as the unevenness decreased and the uniformity of the luminance increased.

The display device 1 according to the first embodiment and display devices according to comparative examples 1 to 3 described below were made as samples. As described above, in the display device 1 according to the first embodiment, three light-diffusing sheets were disposed, and protrusions were defined in the upper surface of each light-diffusing sheet.

Conversely, in the display device according to the comparative example 1, three light-diffusing sheets were disposed, and protrusions were defined in the lower surface of each light-diffusing sheet. In the display device according to the comparative example 2, two light-diffusing sheets were disposed, and protrusions were defined in the upper surface of each light-diffusing sheet. In the display device according to the comparative example 3, two light-diffusing sheets were disposed, and protrusions were defined in the lower surface of each light-diffusing sheet. The evaluation results are shown in Table 1.

TABLE 1

|  | Number of light-diffusing sheets | Protrusions | Score |
|---|---|---|---|
| First embodiment | 3 | Front | 3.2 |
| Comparative example 1 | 3 | Back | 3.0 |
| Comparative example 2 | 2 | Front | 2.8 |
| Comparative example 3 | 2 | Back | 2.6 |

As shown in Table 1, the uniformity of the luminance was higher and the appearance was better for the display device according to the first embodiment in which three light-diffusing sheets were disposed and protrusions were defined in the upper surface of each light-diffusing sheet than for the display device according to the comparative example 1 in which protrusions were defined in the lower surfaces of the three light-diffusing sheets, the display device according to the comparative example 2 in which protrusions were defined in the upper surfaces of two light-diffusing sheets, and the display device according to the comparative example 3 in which protrusions were defined in the lower surfaces of two light-diffusing sheets.

For example, the invention can be utilized in a backlight of a display device, etc.

In the description above, certain embodiments of the present invention are described. However, the present invention is not limited the description above, and should be broadly construed on the basis of the claims. The present invention also encompasses variations and modifications that are made on the basis of the description above.

What is claimed is:

1. A display device, comprising:
    a light-emitting module including
        at least one light guide plate including an upper surface and a lower surface, and
        a plurality of light sources disposed at a lower surface side of the light guide plate; and
    a light-diffusing sheet stacked body including
        a first light-diffusing sheet disposed on the light guide plate,
        a second light-diffusing sheet disposed on the first light-diffusing sheet, and
        a third light-diffusing sheet disposed on the second light-diffusing sheet,
    the first, second, and third light-diffusing sheets each including a light-diffusing material in a resin material,
    the first light-diffusing sheet including a plurality of first protrusions or first recesses at an upper surface side of the first light-diffusing sheet,
    the second light-diffusing sheet including a plurality of second protrusions or second recesses at an upper surface side of the second light-diffusing sheet,
    the third light-diffusing sheet including a plurality of third protrusions or third recesses at an upper surface side of the third light-diffusing sheet,
    wherein a shape of the third protrusion is different from a shape of the first protrusions and/or a shape of the second protrusions, or
    wherein a shape of the third recess is different from a shape of the first recesses and/or a shape of the second recesses,
    wherein at least one of the first protrusions or the first recesses has a rectangular pyramid shape or a shape approximating a rectangular pyramid,
    wherein air is disposed between mutually-adjacent protrusions of the plurality of first protrusions or in the first recesses,
    wherein air is disposed between mutually-adjacent protrusions of the plurality of second protrusions or in the second recesses,
    wherein air is disposed between mutually-adjacent protrusions of the plurality of third protrusions or in the third recesses,
    wherein a lower surface of the first light-diffusing sheet, a lower surface of the second light-diffusing sheet and a lower surface of the third light-diffusing sheet are flat.

2. The device according to claim 1, wherein
    at least one of the second protrusions or the second recesses has a rectangular pyramid shape or a shape approximating a rectangular pyramid.

3. The device according to claim 1, wherein
    at least one of the third protrusions or the third recesses has a rectangular pyramid shape or a shape approximating a rectangular pyramid.

4. The device according to claim 1, wherein
    a major component of the resin material is a polycarbonate resin.

5. The device according to claim 1, wherein
    a distance between centers of mutually-adjacent protrusions or recesses of the plurality of first protrusions or first recesses is not less than 50 μm and not more than 200 μm.

6. The device according to claim 1, wherein
    a distance between centers of mutually-adjacent protrusions or recesses of the plurality of second protrusions or second recesses is not less than 50 μm and not more than 200 μm.

7. The device according to claim 1, wherein
    a distance between centers of mutually-adjacent light sources of the plurality of light sources is not less than 1 mm and not more than 10 mm.

8. The device according to claim 1, wherein
    the first light-diffusing sheet contacts the second light-diffusing sheet, and
    the second light-diffusing sheet contacts the third light-diffusing sheet.

9. A light-diffusing sheet stacked body, comprising:
    a first light-diffusing sheet, a second light-diffusing sheet, and a third light-diffusing sheet that are stacked,
    the first, second, and third light-diffusing sheets each including a light-diffusing material in a resin material,
    the first light-diffusing sheet including a plurality of first protrusions or first recesses at an upper surface side of the first light-diffusing sheet,
    the second light-diffusing sheet including a plurality of second protrusions or second recesses at an upper surface side of the second light-diffusing sheet,
    the third light-diffusing sheet including a plurality of third protrusions or third recesses at an upper surface side of the third light-diffusing sheet,
    wherein a shape of the third protrusion is different from a shape of the first protrusions and/or a shape of the second protrusions, or
    wherein a shape of the third recess is different from a shape of the first recesses and/or a shape of the second recesses,
    wherein at least one selected from the group consisting of the first protrusions, the second protrusions, the first recesses, and the second recesses has a rectangular pyramid shape or a shape approximating a rectangular pyramid, wherein air is disposed between mutually-adjacent protrusions of the plurality of first protrusions or in the first recesses, wherein air is disposed between mutually-adjacent protrusions of the plurality of second protrusions or in the second recesses, wherein air is disposed between mutually-adjacent protrusions of the plurality of third protrusions or in the third recesses, wherein a lower surface of the first light-diffusing sheet, a lower surface of the second light-diffusing sheet and a lower surface of the third light-diffusing sheet are flat.

10. The light-diffusing sheet stacked body according to claim 9, wherein a major component of the resin material is a polycarbonate resin.

11. The light-diffusing sheet stacked body according to claim 9, wherein a distance between centers of mutually-adjacent protrusions or recesses of the plurality of first protrusions, the plurality of second protrusions, the plurality of first recesses, or the plurality of second recesses is not less than 50 μm and not more than 200 μm.

12. The light-diffusing sheet stacked body according to claim 9, wherein a distance between centers of mutually-adjacent protrusions or recesses of the plurality of third protrusions or third recesses is not less than 50 μm and not more than 200 μm.

* * * * *